United States Patent [19]
Yamashita

[11] Patent Number: 5,337,723
[45] Date of Patent: Aug. 16, 1994

[54] FUEL SUPPLY CONTROL DEVICE FOR INTERNAL COMBUSTION ENGINES

[75] Inventor: Takahisa Yamashita, Suntoh, Japan

[73] Assignee: Texas Instruments Incorporated, Dallas, Tex.

[21] Appl. No.: 105,194

[22] Filed: Aug. 9, 1993

[30] Foreign Application Priority Data

Sep. 4, 1992 [JP] Japan .................. 4-263180[U]

[51] Int. Cl.$^5$ .................................. F02M 31/12
[52] U.S. Cl. .......................... 123/549; 123/547
[58] Field of Search ............. 123/549, 546, 547, 552, 123/557

[56] References Cited

U.S. PATENT DOCUMENTS

| | | |
|---|---|---|
| 4,242,999 | 1/1981 | Hoser . |
| 4,350,134 | 9/1982 | Sparks .................. 123/549 |
| 4,387,291 | 6/1983 | Keppel .................. 123/549 |
| 4,395,993 | 8/1983 | Tanaka et al. .......... 123/549 |
| 4,967,706 | 11/1990 | van Wechem et al. ..... 123/549 |
| 5,007,402 | 4/1991 | Scherenberg ........... 123/549 |
| 5,048,500 | 9/1991 | Curhan ................. 123/549 |
| 5,056,495 | 10/1991 | Yamashita et al. ...... 123/549 |
| 5,115,787 | 5/1992 | von Pickartz .......... 123/549 |
| 5,119,794 | 6/1992 | Kushida et al. ........ 123/549 |
| 5,172,673 | 12/1992 | Pelgrim ............... 123/549 |
| 5,209,211 | 5/1993 | Kopp et al. . |

FOREIGN PATENT DOCUMENTS

| | | |
|---|---|---|
| 0404477 | 12/1990 | European Pat. Off. . |
| 0406546 | 1/1991 | European Pat. Off. . |
| 4024841 | 2/1992 | Fed. Rep. of Germany . |
| 4122138 | 8/1992 | Fed. Rep. of Germany . |
| 2356823 | 1/1978 | France . |
| 2037894 | 7/1980 | United Kingdom . |

*Primary Examiner*—Tony M. Argenbright
*Assistant Examiner*—M. Macy
*Attorney, Agent, or Firm*—Russell E. Baumann; Richard L. Donaldson; Rene' E. Grossman

[57] ABSTRACT

A fuel supply control device for an internal combustion engine in which fuel is injected from a fuel injection device (6) in an intake port (2.1) and air that flows into the intake port is mixed with the injected fuel to be supplied to combustion chamber (1) is shown, in which there are provided an intake control valve (20, 30) having a heater (7.3, 7.4) in the intake port and being capable of opening and closing the mixed gas flow passage. Control circuits (12, 13) carry out opening and closing position control of the intake control valve (20, 30) so that, at least during the time when the heater (7.3, 7.4) generates heat, the portion of the heat-generating region of the intake control valve (20, 30) may be located in the fuel injection range, with the valve (20, 30) functioning as a variable heater, variable intake valve and an AD port.

8 Claims, 6 Drawing Sheets

FUEL SUPPLY CONTROL DEVICE FOR INTERNAL COMBUSTION ENGINES

BACKGROUND OF THE INVENTION

Field of the Invention

This invention relates generally to fuel supply control devices for internal combustion engines and more specifically to control devices for controlling the supply of a mixed gas, obtained by mixing air with a fuel, into the combustion chamber of an internal combustion engine and a gasoline engine, in particular.

Description of Related Art

In gasoline engine fuel supply control devices used for example in automobiles, it is conventional to employ electronically controlled fuel injection systems for the direct injection of fuel to the intake port on the entrance side of the combustion chamber by means of an injector whose injection volume is controlled by a control system. The fuel is mixed with air which has entered the intake port through an intake pipe for supply to the combustion chamber inside the cylinder block.

Such electronically controlled fuel supply control devices are generally characterized in having a so called "fuel delay" whereby the fuel supplied to the combustion chamber is delayed because the fuel that has been injected from the injector cannot be completely evaporated and, instead, adheres to the inner wall of the intake port due to the fact that, immediately after start-up or during several tens of seconds after start-up, the engine is cold. In order to prevent this and reduce exhaust gas, a heater is used only during the period immediately after start-up to raise the temperature of the intake port to a level which is higher than the evaporation temperature of the fuel, thereby promoting the inflow of a mixed gas into the combustion chamber.

In such systems the heater generally is composed of material having a positive temperature coefficient of resistivity (PTC) due to its advantageous current limiting nature.

Shortly after start-up, that is, on the order of several tens of seconds, warm water flows to the cylinder block, thereby heating the interior of the intake port. In response to this the heater is deenergized; however, the area in the vicinity of the heater is not heated after deenergization of the heater, thereby resulting in a so called cold spot creating a fuel delay situation by fuel adhesion.

In a conventional fuel supply control system, therefore, the heater is either embedded in the wall surface inside the intake port with the amount that it protrudes into the intake port being minimized or it is so arranged as to project into the intake port only at the time when such is required.

Prior art devices have various shortcomings including spraying fuel toward a heater arranged in the intake pipe upstream of the intake opening of the fuel chamber not only at the time of start-up but also thereafter with concomitant delay of fuel supplied to the intake opening. Other devices change the direction of the spray after start-up but this involves extra moving parts as well as sealing problems. Yet another prior art approach includes a lattice type of heater placed across the cross section of the flow path thereby increasing flow resistance either permanently, or in the case of a movable heater, during start-up.

A variable intake valve disposed upstream of the injector that controls the intake diameter of air in conformance with a profile based on the number of rotations of the engine so that the flow rate is accelerated at start-up is also known. It would be desirable to locate such valve downstream of the injector, however, this would result in creating a cold spot due to fuel adhering to the valve.

It is an object of the present invention to provide a fuel supply control device which is capable of preventing any possible fuel delay without compromising the air seal or increasing the resistance of flow. Another object is the provision of such a device which can also vary the velocity of the fuel mixture without increasing flow resistance. Yet another object is the provision of an improved fuel supply control system free of the prior art limitations referred to above.

SUMMARY OF THE INVENTION

Briefly, in accordance with the invention, fuel is injected from a fuel injection device inside the intake port of an internal combustion engine and is mixed with air that flows into the intake port and is supplied to the combustion chamber in a fuel supply control device in which there is provided an intake control valve arranged between the fuel injection device and the combustion chamber. The position of the intake control valve varies in such a way as to adjust the mixed gas flow rate in response to the load of the internal combustion engine. According to a feature of the invention a heating device, preferably having a positive temperature coefficient of resistivity characteristic, is provided in the intake control valve.

According to a feature of the invention, the intake control valve is moved to such a position that the fuel that has been injected from the fuel injection device hits at least the vicinity of the heated portion during start-up when the water temperature is low. At the same time, the heating element is energized. At this time, fuel is injected in an atomized state from the fuel injection device, pulse controlled by the control system. The fuel that has been injected from the fuel injection device is blown to the heated portion of the intake control valve. The fuel, such as gasoline, that has been blown is immediately evaporated since the ambient temperature is higher than the evaporation point and is mixed with the air that has passed through the intake pipe and this mixed gas flows in toward the combustion chamber.

At this juncture, the mixed gas has a higher flow rate and, therefore, the inflow of the mixed gas into the combustion chamber is accelerated as a part, or most, of the intake port is closed by the intake control valve with the diameter of the flow path being reduced. After the start-up action as described above, or in the warmed-up state, the position for the opening or closing of the intake control valve is suitably controlled by the control means in response to the number of rotations of the engine.

Specifically, control of the supply of mixed gas into the combustion chamber is carried out by increasing the flow rate of air by narrowing the passageway at the time when the number of rotations of the engine is small and the said passageway is expanded and the flow volume of air is increased once the engine has rotated a selected number of times.

In other words, the intake control valve has a similar function as the variable control valve and also has the function of an AD (Aero Dynamic) port which changes the flow rate by changing the diameter of the flow path.

According to a feature of one of the embodiments of the invention, the intake control valve is arranged in one of the intake ports of an engine having two intake ports per cylinder, thereby creating a swirl effect. According to a feature of another embodiment of the invention, the intake control valve is arranged in both intake ports of an engine having two intake ports per cylinder, thereby creating a tumble effect.

DESCRIPTION OF THE PREFERRED EMBODIMENTS

Before discussing the invention, FIGS. 1–5 which are rough cross sections showing examples of the intake port portion of conventional fuel supply control devices will be discussed. (Refer, for example to Utility Model No. Sho 61-107961 shown in the Japanese Official Gazette.) In these figures, numeral 1 indicates a combustion chamber, 2 an intake valve, 2.1 an intake port, 3 a cylinder block, 4 a cylinder head, 5 an intake pipe, 6 an injector, 7 a PTC heater, 8 a temperature switch and 9 an electric energization control circuit for the PTC heater 7.

Figure 1:
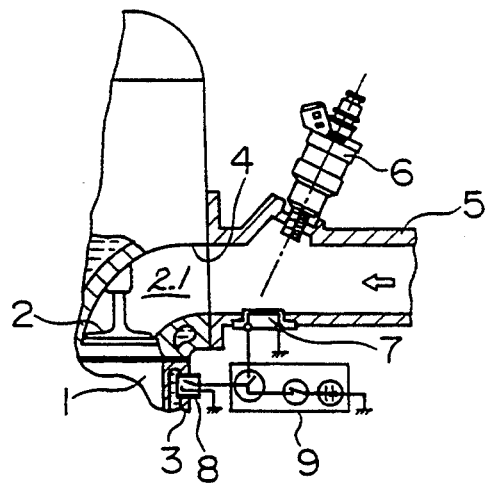
FIGS. 1–5 are cross section views showing examples of the construction of conventional fuel supply control devices.

The fuel supply control device shown in FIG. 1 has a construction wherein a PTC heater 7 is embedded in the vicinity of the region where intake pipe 5 is connected to cylinder head 4 and with the spray of the injector 6 directed toward the embedded heater.

In such a construction, electricity is conducted to PTC heater 7 by the control circuit 9 at the time of engine start-up. Because of this, the temperature in the vicinity of the area where the PTC heater is arranged rises to a level which is higher than approximately 110 degrees centigrade which is the evaporation point of the gasoline, such as in the neighborhood of 200 degrees centigrade, to cite an example.

Atomized gasoline is blown from injector 6 to this elevated temperature region. The gasoline that has been blown is immediately evaporated as the ambient temperature is higher than the evaporation point and is mixed with air when it passes intake pipe 5 and flows into combustion chamber 1 when intake valve 2 is in an open state.

After start-up, the temperature of the intake port 2.1 rises due to warm water that flows in cylinder block 3 and, when it reaches the set temperature, the temperature is detected by temperature switch 8 and electric current to PTC heater 7 is terminated by control circuit 9.

Figure 2:
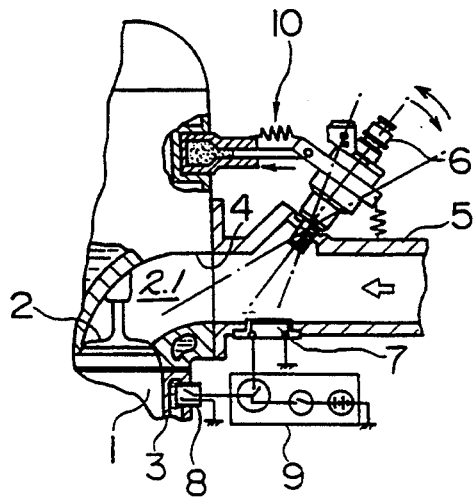

The fuel supply control device which is shown in FIG. 2 has a construction in which the position of the PTC heater arrangement is the same as the device shown in FIG. 1 but the fuel injection direction of the injector 6 is made to change between start-up time and after warm-up by employing an injector driving mechanism 10.

In other words, the injection spray direction of the injector 6 is set in the direction of the embedded heater portion at the time of start-up, with the fuel being evaporated by the heat of the heater, and, after warm-up, the alignment of the injector 6 is set in the direction of the arrangement of the intake valve 2 or directly toward the intake opening of combustion chamber 1, thereby preventing any delay of the fuel supply.

Figure 3:
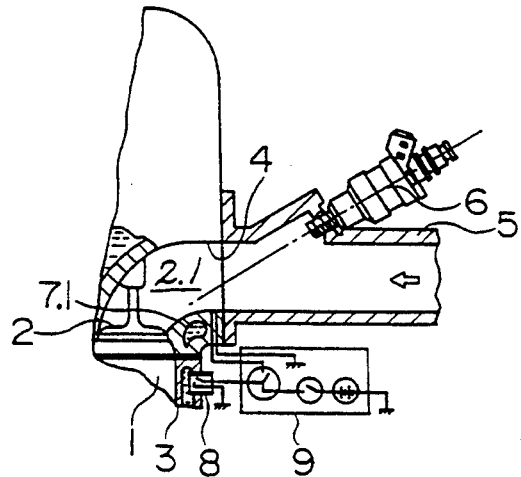

The fuel supply control device which is shown in FIG. 3 has the injection spray direction of the injector 6 aligned with the direction of the intake port 2.1 or fixed directly in the direction of the intake opening of the combustion chamber 1, with the PTC heater 7.1 being embedded in the wall surface of the cylinder head 4 in the intake opening.

Figure 4:
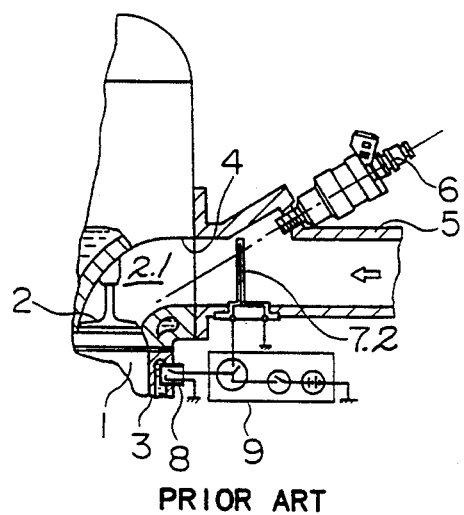

The fuel supply control device which is shown in FIG. 4 has a construction in which a PTC heater 7.2 has a lattice construction of approximately the same diameter as the inner diameter of the intake pipe 5 and is arranged near the connection region with the cylinder head 4 inside the intake pipe 5.

The direction of the injection spray of the injector 6 in this case is fixed directly toward the intake port 2.1 and the fuel that has passed the lattice construction of the PTC heater 7.2 becomes a mixed gas with air and is supplied to the intake opening of the combustion chamber 1.

Figure 5:
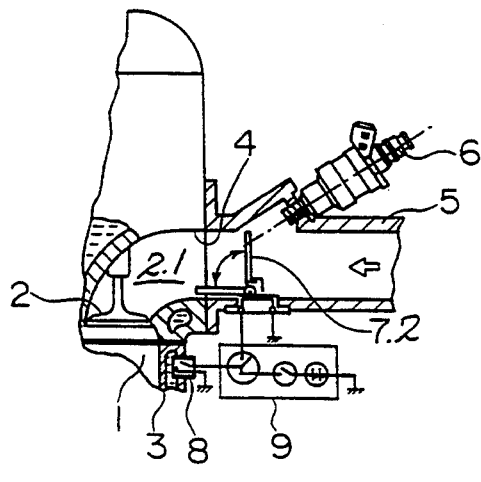

The fuel supply control device which is shown in FIG. 5 has a construction such that the PTC heater 7.2 of the lattice construction shown in FIG. 4 is made into a variable type, being caused to stand up inside the intake pipe 5 only at the time of the start-up.

Moreover, in the fuel supply control device having a construction as described above, a variable intake valve 11 of FIG. 6 that controls the intake diameter of air in conformity with the number of rotations of the engine is provided in the intake pipe 5 so that, at the time when the number of rotations is small, the passageway is narrowed and the flow rate of the air is made higher and, after a selected number of rotations when the number of rotations is large, the passageway is opened and the flow rate of the air is increased, thereby effecting a supply control of the mixed gas to the fuel chamber.

Figure 6:
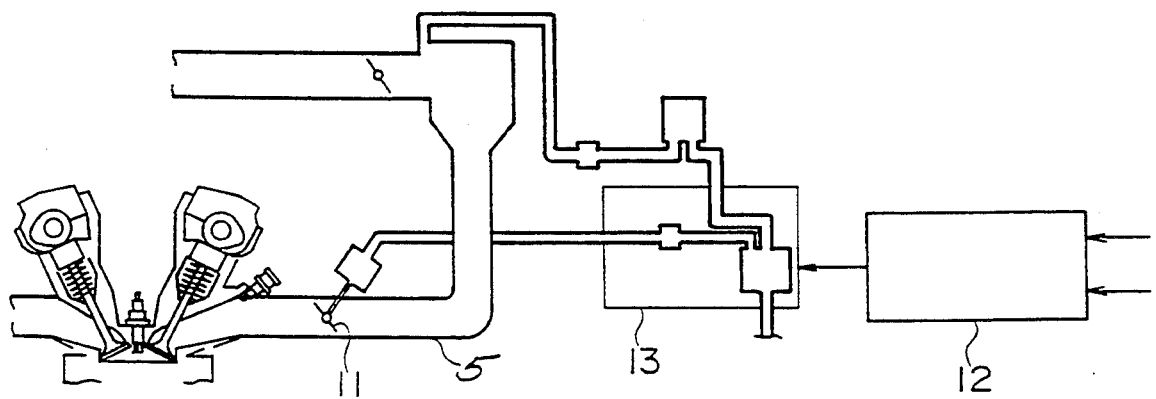
FIG. 6 is a schematic view of a control system having a variable intake valve.

In FIG. 6, numeral 12 indicates a valve control circuit which outputs an intake valve switch signal by receiving the rotation number signal and intake volume signal, and 13 is a valve drive circuit which rotates the intake valve 11 by a prescribed angle with the support axis as the center by receiving an intake valve switch signal. The valve drive circuit 13 is typically made of a variable intake control solenoid valve and other suitable associated components.

The fuel supply control devices which have been described above have, inter alia, the following shortcomings:

In the device shown in FIG. 1, the fuel is injected toward the vicinity of the PTC heater 7 of the intake pipe 5 disposed in the upstream side of the intake opening of the fuel chamber 1 not only at the time of start-up but also after warm-up, with a result that there develops a fuel supply delay as compared with the case where the injection takes place directly to the intake opening.

In the device which is shown in FIG. 2, there is little danger of any fuel supply delay as the fuel is directly injected into the intake opening after warm-up; however, the construction becomes complicated as the injector 6 is made movable and, moreover, there is a problem in terms of the air seal of the piping and intake port.

In the device shown in FIG. 3, the injector 6 is fixed and the fuel is directly injected into the intake opening not only after warm-up but at all times, with a result that there is little danger of any problem developing concerning the piping and air-tightness, but that the problem of a "cold spot" as described earlier develops after deenergization of PTC heater 7.1.

In the device shown in FIG. 4, the flow resistance increases as PTC heater 7.2 of the lattice construction is arranged across the entire cross sectional area of the flow path.

Even in the device shown in FIG. 5, the flow resistance increases at start-up, thereby making it difficult to carry out fuel supply satisfactorily.

Although it is desirable for the variable intake valve 11 to be arranged in the intake port on the down-stream side of the injector 6 as it changes the air flow rate and adjusts the inflow volume of the mixed gas into the fuel chamber in this case; however, the fuel that has been injected from the injector 6 would adhere to the variable intake valve 11, thereby serving as a factor for fuel supply delay. In the conventional device, therefore, this cannot be arranged in the intake port.

Even though an AD (Aero Dynamic) port that accelerates the flow rate by reducing the diameter of the intake port has been realized, it is not possible to change the intake diameter in conformity with the number of rotations inasmuch as it is of the fixed type.

The present invention overcomes the above described prior art limitations by providing a fuel supply control device which is capable of preventing any possible fuel delay without compromising the air-seal or exhibiting any increase in flow resistance and which can make the air flow rate variable in the intake port of an internal combustion engine.

Figure 7:
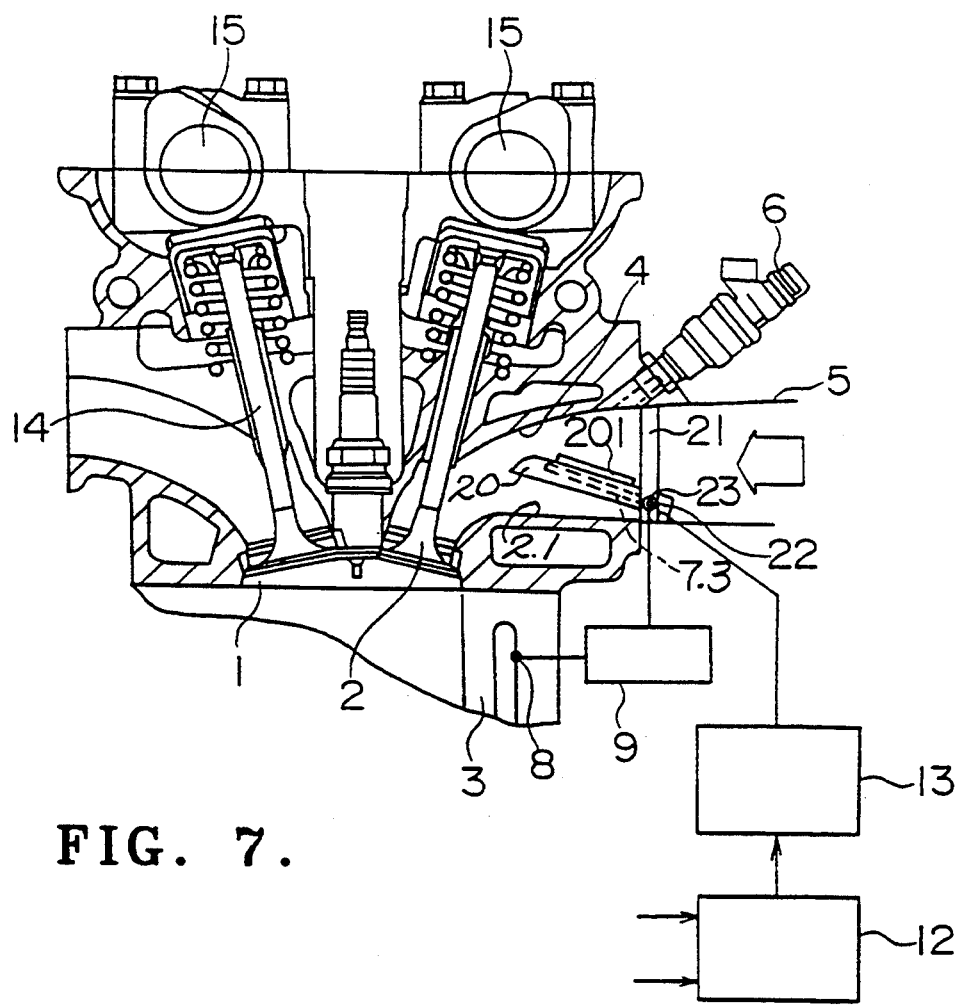
FIG. 7 is a cross sectional view of a fuel supply control device made in accordance with the invention.

Referring now to FIG. 7 a fuel supply control device made in accordance with the invention for a gasoline engine is shown including a combustion chamber 1, an intake valve 2, an inlet port 2.1, a cylinder block 3, cylinder head 4, intake pipe 5, injector 6, PTC heater 7.3, valve control circuit 12, valve drive circuit 13, exhaust valve 14, cam shaft 15 and an intake control valve 20. Intake control valve 20 is configured generally as a plate with its tip portion curved in a streamlined fashion and, on its upper surface, a plurality of fins 201 are formed for the purpose of giving the flow of the intake a prescribed direction. A frame or holder plate 21 is inserted and fixed between cylinder head 4 and intake pipe 5 with intake control valve 20 rotatably supported by a drive shaft 22.

Drive shaft 22 is rotated and driven by valve driving circuit 13. In other words, rotation to a prescribed angle is effected by a valve switch signal that is outputted on the basis of the input of the rotation number signal and intake volume signal in the valve control circuit 12. This rotation control is the same as the control of the conventional variable intake valve.

This intake control valve 20 is rotatably controlled so that the fuel that has been injected from injector 6 will hit its center and its tip portion at the time of the start-up.

This intake control valve 20 is made of material having high thermal conductivity such as aluminum, etc. and the PTC heater 7.3 is placed internally in the flat plate in the neighborhood of its upper surface.

In addition, a positive electrode 23 is arranged along the axial direction at the axial center of the driving shaft 22. The PTC heater 7.3 is grounded through the main intake control valve body 20 and the holder plate 21.

The PTC heater 7.3 is electrically energized through the positive electrode 23 by control circuit 9 in response to temperature switch 8 at start-up when the engine is cold, thereby elevating the temperature of the intake control valve 20 as a whole and its upper surface, in particular, to a level which is higher than the evaporation point of the gasoline (above approximately 110 degrees centigrade and specifically at approximately 200 degrees centigrade).

Figure 8A:
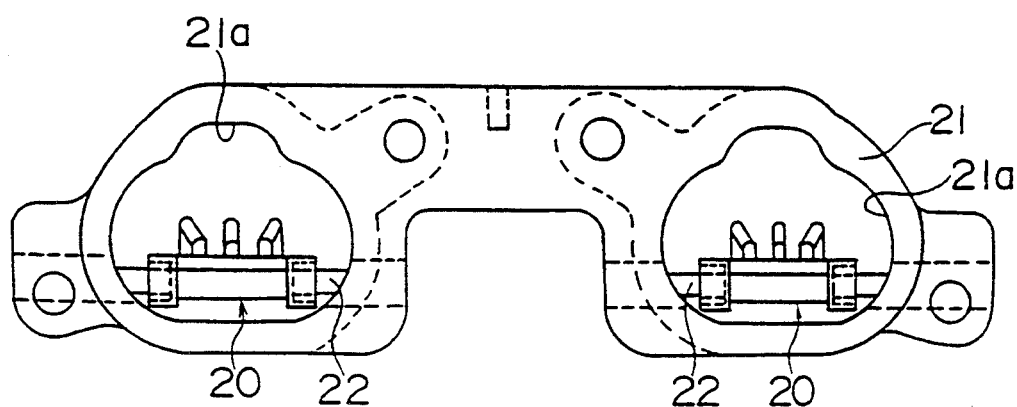
FIGS. 8(a), 8(b) and 8(c) are plan, front and side views respectively of the fuel supply control device used in two intake ports of a gasoline engine having two cylinders on one side.
Figure 8B:
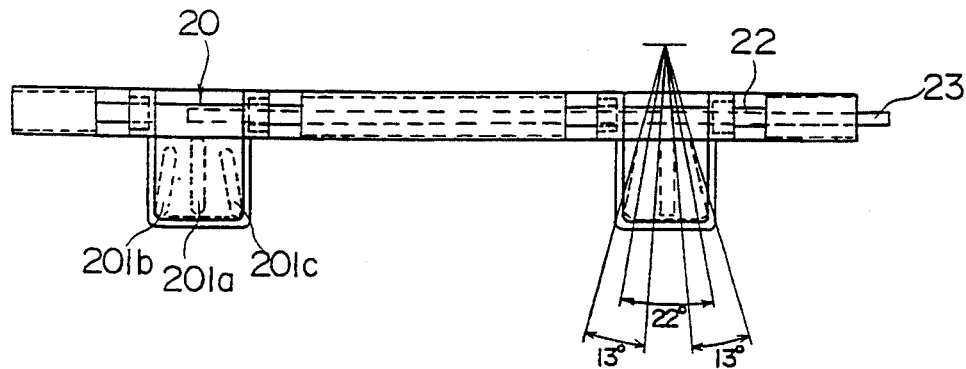
Figure 8C:
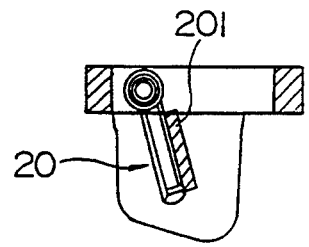

FIGS. 8(a), 8(b) and 8(c) show an example of the construction of an intake control valve which is applied to the two intake ports of a gasoline engine having two cylinders on one side.

As is shown in the figures, the intake control valve 20 in this example is journaled by a drive shaft 22 in such a way as to extend in the direction of the cross section of the aperture or opening 21a which has been formed in the holder plate 21 and three fins 201a, 201b and 201c are integrally formed on its upper surface.

The fin 201a is formed along the longitudinal direction approximately at the center of the upper surface of the intake control valve 20 and, on both sides of this fin 201a, the fins 201b and 201c extend outwardly in the order of approximately 11 to 13 degrees relative to the direction of fin 201a in order to conform with the direction of the fuel injection from the injector 6.

Thus, it becomes possible to increase the area of the heating surface and, at the same time, avoid any increase in the flow resistance (which is more than is required).

Next, the operation based on the aforementioned construction will be explained:

At start-up when the water temperature is low, a valve switch signal is outputted from the valve control circuit 12 to the valve drive circuit 13, so that drive shaft 22 is rotated by a prescribed angle. The upper surface extending from the center of the intake control valve 20 to the tip portion rotates reducing the diameter of the flow path and so that the fuel that has been injected from the injector 6 hits the control valve.

At the same time, PTC heater 7.3, which is accommodated in the intake control valve 20, is energized by control circuit 9 through the electrode 23.

The PTC heater generates heat as the electric current flows. Since a large electric current flows at the time of low temperature, the PTC heater 7.3 reaches a high temperature in a short period of time. This heat is conducted to the body of main intake control valve 20 and the temperature of the intake control valve 20 rises up to approximately 200 degrees centigrade.

As the resistance value rises along with elevation of the temperature, PTC heater 7.3 has a self control function of reducing the current level and lowering the rate of the temperature rise, finally reaching a state of equilibrium.

At this juncture, gasoline which has been pulse controlled by a control system, not shown in the drawing, is injected in an atomized state from the injector 6.

The gasoline which has been injected from injector 6 is blown to the intake control valve 20 whose temperature has reached the neighborhood of 200 degrees centigrade. Gasoline that has been injected is immediately evaporated because the ambient temperature is higher than the evaporation temperature, is mixed with air that has passed through the intake pipe 5, and this mixed gas enters the combustion chamber 1 at the time when the intake valve 2 is in an open state.

At this time, the mixed gas has a high flow rate as the bottom of the passage in cylinder head 4 is blocked by the intake control valve 20 leaving open the upper portion where the diameter is small (see FIG. 8(a)). In view of the fact that the tip side of the intake control valve is given a curved surface in order to assume a streamlined shape, the inflow of the mixed gas into the combustion chamber 1 is accelerated.

When the temperature of the warm water flowing in the cylinder block 3 raises the temperature of the intake port 2.1 to a set temperature after start-up, the temperature is detected by a temperature switch 8 and PTC heater 7 is then deenergized by control circuit 9.

After start-up or when a warmed-up state is reached, intake control valve 20 is suitably rotated under the control the valve control circuit 12, with torque control being exercised satisfactorily.

Specifically, the passageway is narrowed and the flow rate is raised at a time when the number of rotations of the engine is small and the passageway is expanded at a time when the number of rotations is large, thereby carrying out the control of the supply of the mixed gas to the combustion chamber.

In other words, the intake control valve 20 has not only the same function as the conventional variable intake valve but also the function of an AD port.

According to this example which has been explained above, the PTC heater 7.3 is rotated and controlled in response to the number of rotations, etc. and is accommodated in the intake control valve 20 whose tip portion has been stream-lined, with a consequence that the fuel delay or flow resistance that have developed at the start-up in the conventional device can be prevented and, at the same time, the control of the flow rate can be carried out easily at high efficiency.

Further, in view of the fact that the position of the heater has been made variable the rate of fuel utilization which was approximately 30 percent due to cold spots, etc. in the past has been increased to approximately 100 percent, with the volume of utilization being optionally controlled.

As has been described earlier, moreover, the intake control valve made in accordance with the invention exercises the function of an AD port and its position can be altered depending upon the load and the rotational conditions.

It is also possible to reduce the flow resistance when the load is heavy and at times of high rotation.

In addition, it becomes possible to obtain a satisfactory distribution of the mixed gas in the combustion chamber 1 in response to the position of an intake control valve according to this invention and induce a swirl effect (horizontal air-eddy) or a tumble effect (vertical air-eddy) for the purpose of raising the combustion efficiency. In other words, it becomes possible to give the function of a swirl control valve and a tumble control valve in addition to the functions of the aforementioned variable heater, variable intake valve and AD port to the intake control valve.

Figure 9A:
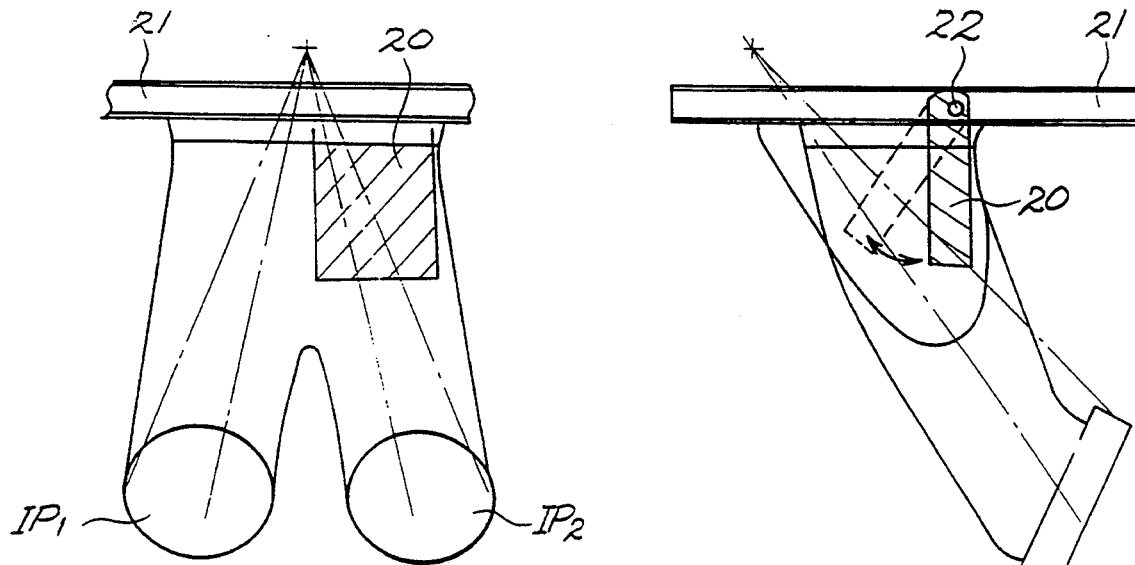
FIGS. 9(a) and 9(b) are front and side views respectively of the fuel supply control device according to an embodiment in which the intake control valve is applied to one of two intake ports of an internal combustion engine having four valves per cylinder to create a swirl effect.
Figure 9B:
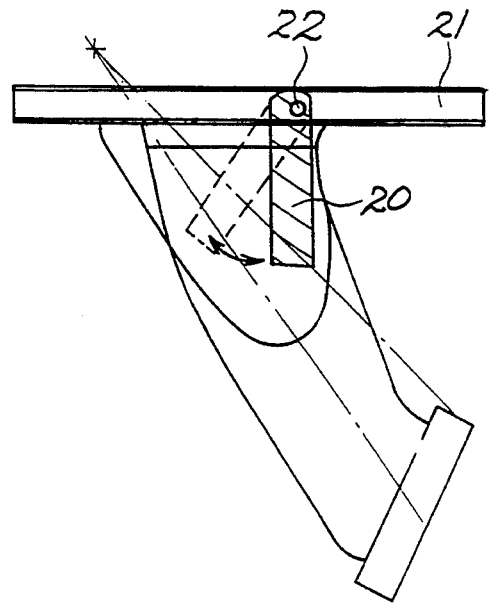

FIGS. 9(a) and 9(b) show the arrangement of the intake control valve 20 in the case where it is applied to two intake ports of an internal combustion engine having four valves (two for the intake and exhaust each) per cylinder in order to create a swirl effect. In this embodiment, intake control valve 20, having the same construction as has been described above, is arranged on one side in alignment with either one of the intake ports IP1 and IP2.

Figures 10A, 10B:
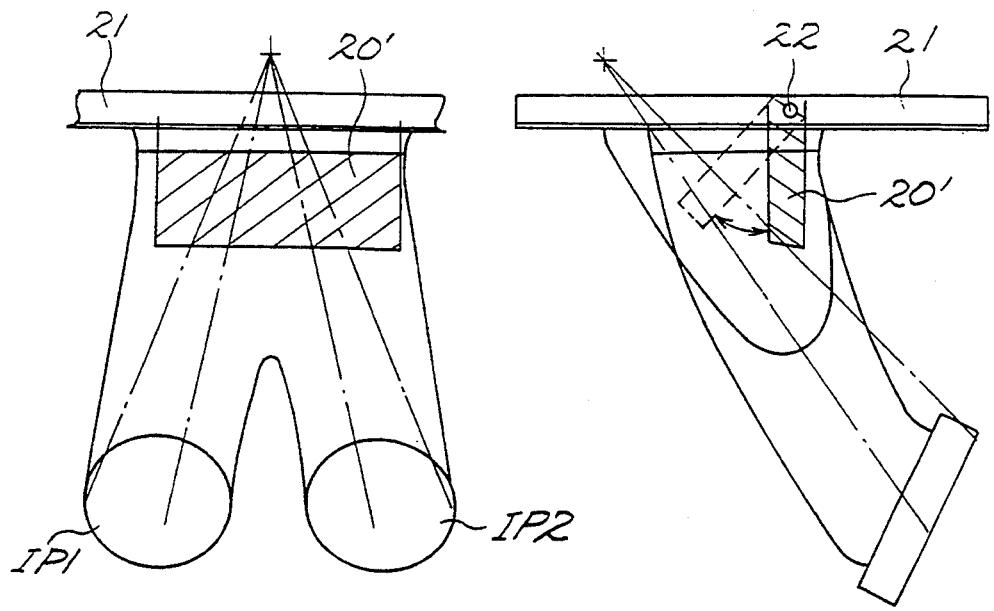
FIGS. 10(a) and 10(b) are front and side views respectively of the fuel supply control device according to an embodiment in which the intake control valve is applied to two intake ports of an internal combustion engine having four valves per cylinder to create a tumble effect.

FIGS. 10(a) and 10(b) show the arrangement of the intake control valve 20' in the case where it is applied to two intake ports of an internal combustion engine having four valves per cylinder in order to create a tumble effect. In this embodiment, intake control valve 20', having a construction similar to that described above, is arranged in alignment with both intake ports IP1 and IP2.

Figure 11A:
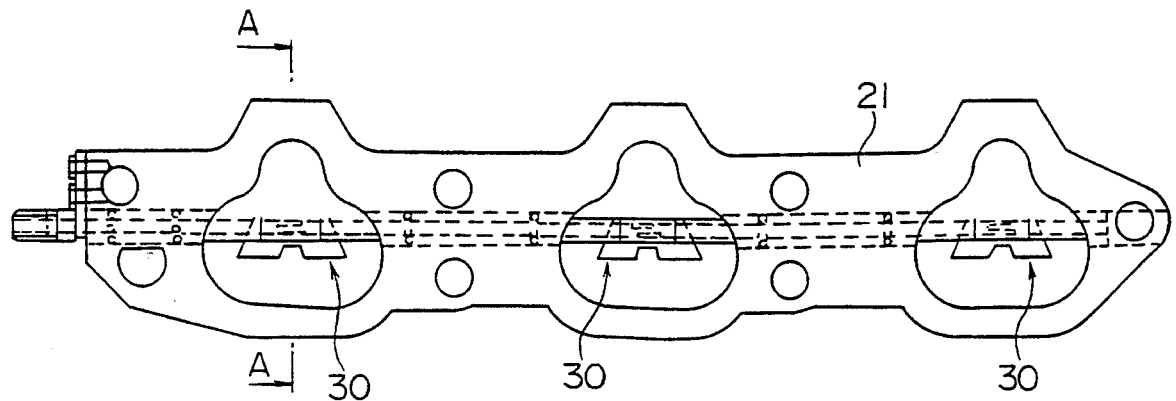
FIGS. 11(a), 11(b) and 11(c) are plan, a cross section taken on lines A—A of FIG. 11(a) and a view taken in the direction of arrow C in FIG. 11(b) respectively of the fuel supply control device according to an embodiment in which a modified intake control valve is applied to one side of three cylinders of a V6 engine.
Figures 11B, 11C:
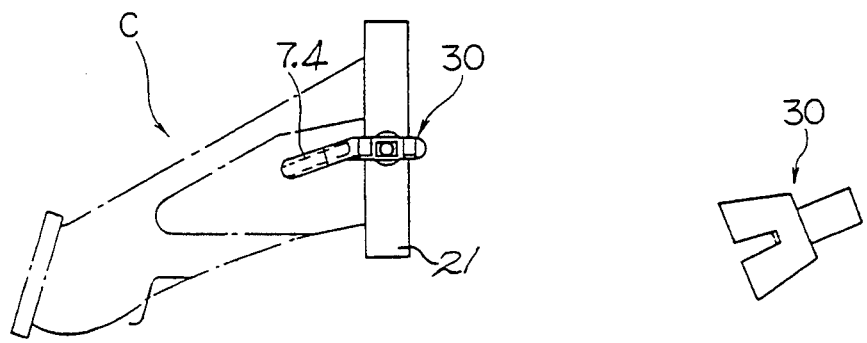

FIGS. 11(a), 11(b) and 11(c) show another example of the intake control valve. This intake control valve 30 has a construction which can be applied to one side of three cylinders of a V6 engine. Intake control valve 30 is bifurcated in such a way as to open to both sides from its center to the tip.

In other words, this intake control valve 30 has a construction capable of creating a tumble effect.

Figure 12A:
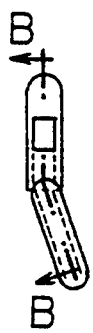
FIGS. 12(a) and 12(b) show a side and cross sectional views of the intake control valve of FIGS. 11(a)–11(c).
Figure 12B:
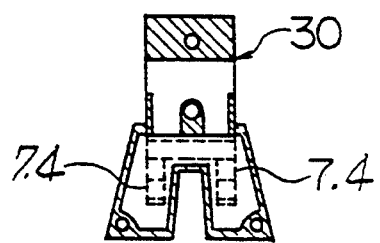

The PTC heater 7.4 is accommodated in that portion of the valve which is bifurcated as is shown in FIGS. 12(a) and 12(b).

In a fuel supply control device having an intake control valve 30 of such a construction, an effect which is the same as described above can be obtained.

As has been explained above, it becomes possible to prevent a fuel supply delay or an increase in flow resistance that have developed during the start-up in conventional devices and, at the same time, to easily carry out the control of the flow rate at high efficiency.

As the position of the heater has been made variable, the fuel efficiency of approximately 30 percent in the past has now been raised to approximately 100 percent, with the volume being freely controllable.

In addition, the intake control valve made in accordance with the invention can function as an AD port. Moreover, its position can be modified, depending upon the load and the rotary conditions. At the same time, it becomes possible to reduce the flow resistance at the time of a large load and a high rotation.

The device can function as an intake valve that can generate a swirl effect or a tumble effect in addition to the various functions as described above.

The foregoing is considered illustrative of the principles of the invention. Since numerous modifications and changes will readily be apparent to those skilled in the art it is not intended to limit the invention to the exact construction and operation shown and described and, accordingly, all suitable modifications and equivalents may be resorted to, falling within the scope of the claims.

I claim:

1. A fuel supply control device for internal combustion engines having a combustion chamber, a cylinder having an inlet valve in an inlet port in communication with the combustion chamber, an air intake pipe in communication with the inlet port for providing a flow path of air to the inlet port and a fuel injector adapted to inject fuel into the flow of air with a selected spray pattern comprising a rotably mounted intake control valve mounted intermediate the intake pipe and the inlet port, said intake control value including a generally flat plate and at least one central and two outer spaced elongated fins provided on one surface thereof, the one central fin extending in the direction of the flow path and the two outer fins extending at an angle to the direction of the flow path generally in conformance with the spray pattern of the injector, an electric heater mounted in the intake control valve and a control circuit to control the angular position of the intake control valve and the state of energization of the electric heater, the injector being positioned to direct its spray toward the inlet valve and the intake control valve being rotable to variable positions between a raised position intercepting the spray from the injector and reducing the effective cross sectional area of the flow path and a lowered position effectively out of the spray and increasing the effective cross sectional area of the flow path.

2. A fuel supply control device made in accordance with claim 1 in which the intake control valve is formed of thermally conductive material.

3. A fuel supply control device made in accordance with claim 1 in which the control valve is a generally flat plate having two opposite end portions, the control valve being rotatably mounted at one opposite end.

4. A fuel supply control device made in accordance with claim 1 in which the intake control valve is a generally flat plate having opposite end portions, one opposite end being formed with a smooth curved surface portion to optimize streamlined fluid flow.

5. A fuel supply control device made in accordance with claim 1 including a holder plate mounted intermediate the intake air pipe and the cylinder head, the holder plate formed with an aperture to receive the intake control valve therein, a bore extending transversely through the holder plate in communication with the aperture and a drive shaft received in the bore, the intake control valve being fixedly mounted to the drive shaft so that it will rotate with the drive shaft, and means to rotate the drive shaft in response to the control circuit.

6. A fuel supply control device made in accordance with claim 1 in which the internal combustion engine has a selected number of cylinders and has two intake ports for each cylinder and the intake control valve is disposed in alignment with both intake ports.

7. A fuel supply control device for internal combustion engines having a combustion chamber, a cylinder head having an inlet valve in an inlet port in communication with the combustion chamber, an air intake pipe in communication with the inlet port for providing a flow path of air to the inlet port and a fuel injector adapted to inject fuel into the flow of air comprising a rotably mounted intake control valve mounted intermediate the intake pipe and the inlet port, said intake control valve being bifurcated having first and second legs extending from a central mounting portion, an electric heater mounted in the intake control valve extending into said first and second legs and a control circuit to control the angular position of the intake control valve and the state of energization of the electric heater, the injector being positioned to direct its spray toward the inlet valve and the intake control valve being rotable to variable positions between a raised position intercepting the spray from the injector and reducing the effective cross sectional area of the flow path and a lowered position effectively out of the spray and increasing the effective cross sectional area of the flow path.

8. A fuel supply control device for internal combustion engines having a selected number of cylinders with two intake ports per cylinder, an air intake pipe in communication with the intake ports for the selected number of cylinders for providing a flow path of air to the intake ports and a fuel injector adapted to inject fuel into the flow of air comprising a rotably mounted intake control valve mounted intermediate the intake pipe and the intake ports in alignment with only one of the two intake ports, an electric heater mounted in the intake control valve and a control circuit to control the angular position of the intake control valve and the state of energization of the electric heater, the injector being positioned to direct its spray toward a cylinder of the selected number of cylinders and the intake control valve being rotable to variable positions between a raised position intercepting the spray from the injector and reducing the effective cross sectional area of the flow path and a lowered position effectively out of the spray and increasing the effective cross sectional area of the flow path.

* * * * *